United States Patent
Naka et al.

(10) Patent No.: US 7,668,668 B2
(45) Date of Patent: *Feb. 23, 2010

(54) STRESS COMPONENT MEASUREMENT METHOD

(75) Inventors: Nobuyuki Naka, Kyoto (JP); Shinsuke Kashiwagi, Kyoto (JP)

(73) Assignee: Horiba, Ltd., Kyoto (JP)

(*) Notice: Subject to any disclaimer, the term of this patent is extended or adjusted under 35 U.S.C. 154(b) by 150 days.

This patent is subject to a terminal disclaimer.

(21) Appl. No.: 11/869,224

(22) Filed: Oct. 9, 2007

(65) Prior Publication Data

US 2008/0086276 A1    Apr. 10, 2008

(30) Foreign Application Priority Data

Oct. 10, 2006  (JP)  ............................ P2006-277028
Jun. 28, 2007  (JP)  ............................ P2007-171149

(51) Int. Cl.
 *G01L 5/00* (2006.01)
(52) U.S. Cl. ...................................... 702/42
(58) Field of Classification Search .................... 702/42
See application file for complete search history.

(56) References Cited

U.S. PATENT DOCUMENTS 5,999,255 A * 12/1999 Dupee et al. ............... 356/301
2007/0222472 A1 * 9/2007 Raravikar et al. ........... 324/765
2008/0084552 A1 * 4/2008 Naka et al. .................. 356/32

FOREIGN PATENT DOCUMENTS

| GB | 2 416 839 A | 2/2006 |
| JP | 01-219529 | 9/1989 |
| JP | 2000-009664 | 1/2000 |
| JP | 2006-073866 | 3/2006 |

* cited by examiner

*Primary Examiner*—Bryan Bui
*Assistant Examiner*—Jonathan Teixeira Moffat

(57) ABSTRACT

A method of measuring a stress component in a short period of time in a nondestructive manner and a stress component measurement device that includes a stress component comparison section that compares a Raman spectrum L obtained in a predetermined area W1 of a reference specimen W to which a given stress component is applied with the stress component, a correlation data production section that produces correlation data indicating a correlation between the Raman spectrum L and the stress component by the use of a multivariate analysis method based on the comparison results conducted by the stress component comparison section. The comparison is conducted multiple times on different predetermined areas W1. A correlation data storage section stores the correlation data, and a stress component calculation section calculates a stress component applied to a measurement area W1' of a measurement specimen W' whose composition is the same as that of the reference specimen W based on the Raman spectrum L obtained from the measurement area W1' and the correlation data.

4 Claims, 19 Drawing Sheets

(a)
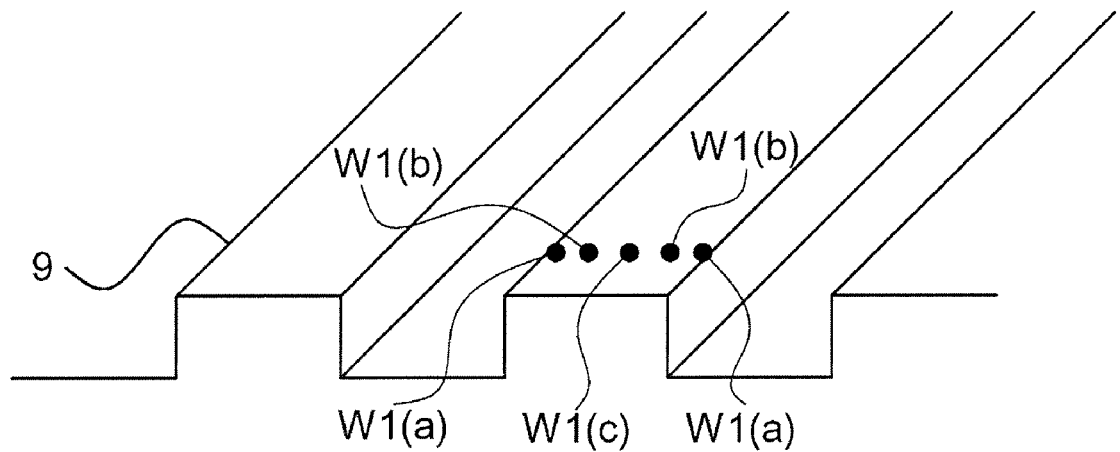
(b)
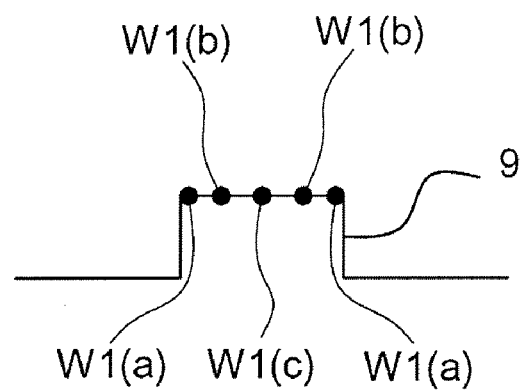
Fig.4

$$\begin{pmatrix} \sigma_{xx} \\ \sigma_{yy} \\ \sigma_{zz} \\ \tau_{xy} \\ \tau_{yz} \\ \tau_{zx} \end{pmatrix} = \begin{pmatrix} C_{11} & C_{12} & C_{13} & C_{14} & C_{15} & C_{16} \\ C_{21} & C_{22} & \cdot & \cdot & \cdot & \cdot \\ C_{31} & \cdot & C_{33} & \cdot & \cdot & \cdot \\ C_{41} & \cdot & \cdot & C_{44} & \cdot & \cdot \\ C_{51} & \cdot & \cdot & \cdot & C_{55} & \cdot \\ C_{61} & \cdot & \cdot & \cdot & \cdot & C_{66} \end{pmatrix} \cdot \begin{pmatrix} \nu_1 \\ A_1 \\ \omega_1 \\ \nu_2 \\ A_2 \\ \omega_2 \end{pmatrix}$$

Fig. 8

*Selection rules for backscattering from a (001) surface:* x=[100], y=[010], z=[001]

x'=(1/$\sqrt{2}$)[110], y'=(1/$\sqrt{2}$)[1-10], z=[001]

|  | LO$_Z$ | TO$_X$ | TO$_Y$ |
|---|---|---|---|
| z(xy)$\bar{z}$ | d$^2$ | 0 | 0 |
| z(x'x')$\bar{z}$ | d$^2$ | 0 | 0 |
| z(y'y')$\bar{z}$ | d$^2$ | 0 | 0 |

*Selection rules for backscattering from a (110) surface:* x=[100], y=(1/$\sqrt{2}$)[1-10], z=(1/$\sqrt{2}$)[110]

x'=(1/$\sqrt{6}$)[-112], y'=(1/$\sqrt{3}$)[1-11], z=(1/$\sqrt{2}$)[110]

|  | LO$_Z$ | TO$_X$ | TO$_Y$ |
|---|---|---|---|
| z(yy)$\bar{z}$ | 0 | d$^2$ | 0 |
| z(x'x')$\bar{z}$ | 0 | 2/3d$^2$ | 1/3d$^2$ |
| z(x'y')$\bar{z}$ | 0 | 1/3d$^2$ | 0 |
| z(y'y')$\bar{z}$ | d$^2$ | 0 | 4/3d$^2$ |

*Selection rules for backscattering from a (111) surface:* x=(1/$\sqrt{2}$)[1-10], y=(1/$\sqrt{6}$)[11-2], z=(1/$\sqrt{3}$)[111]

|  | LO$_Z$ | TO$_X$ | TO$_Y$ |
|---|---|---|---|
| z(xy)$\bar{z}$ | 1/3d$^2$ | 0 | 2/3d$^2$ |
| z(xy)$\bar{z}$ | 0 | 2/3d$^2$ | 0 |
| z(yy)$\bar{z}$ | 1/3d$^2$ | 0 | 2/3d$^2$ |

Fig.10

(a)
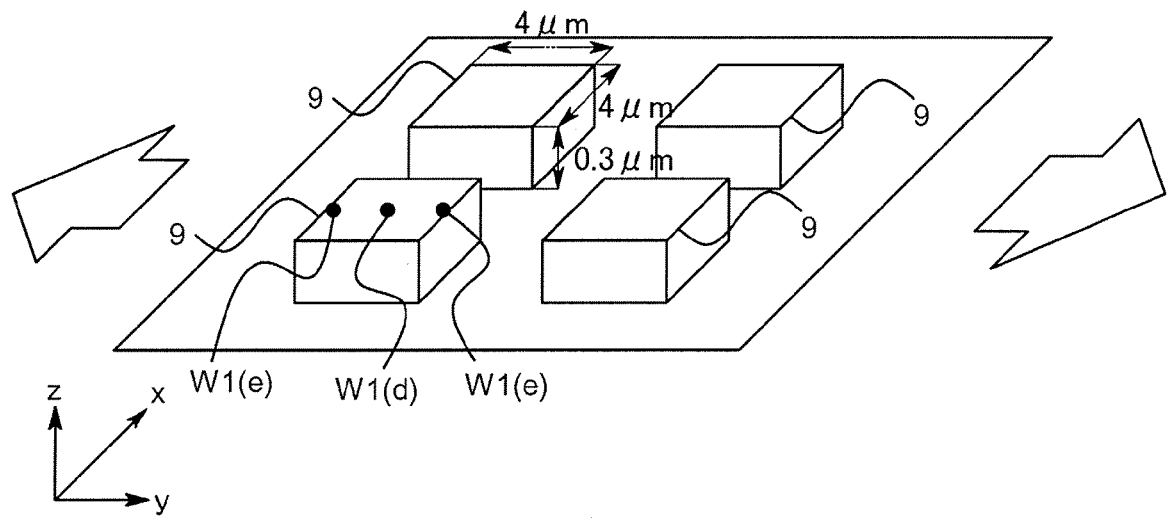
(b)
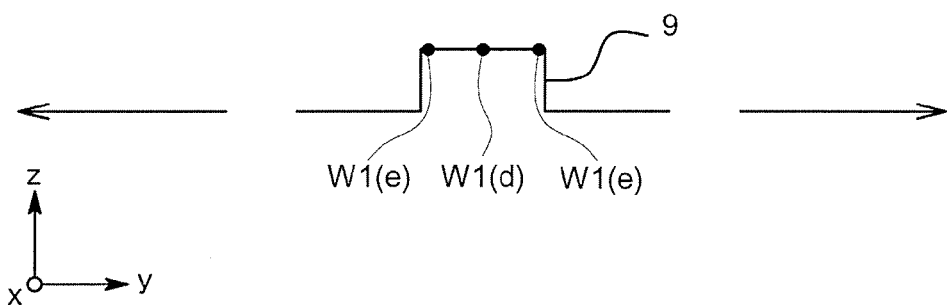
(c)
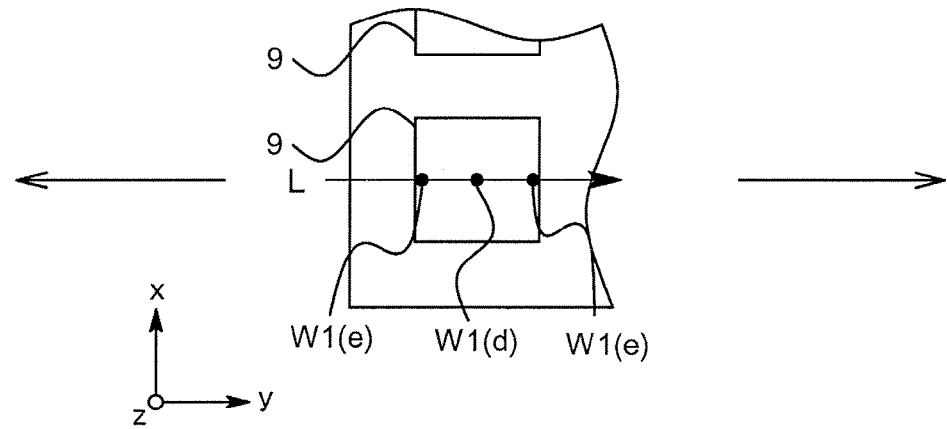
Fig.11

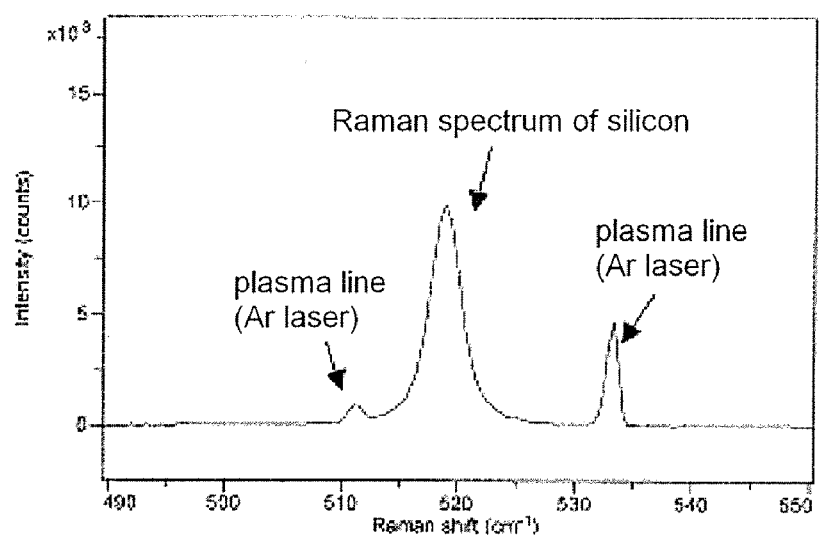
curve fitting by the use of either
one of Gauss function, Lorentz function and
Voigt function (Gauss function + Lorentz function)
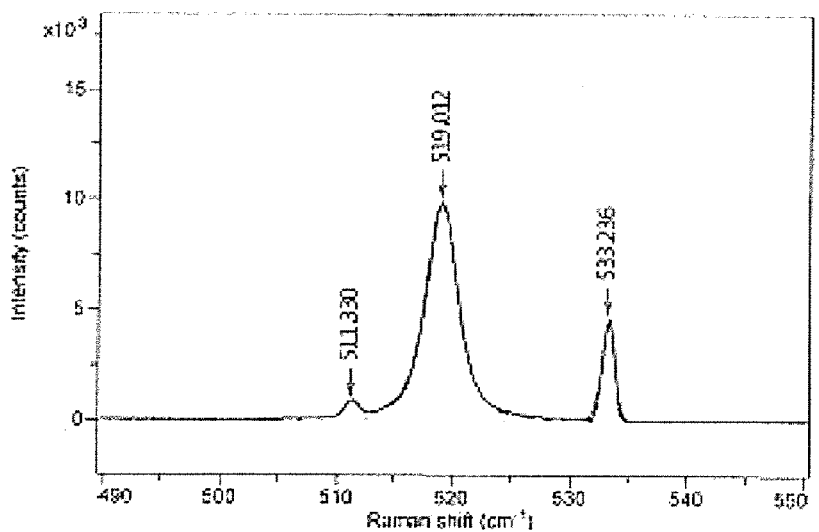
Fig.12

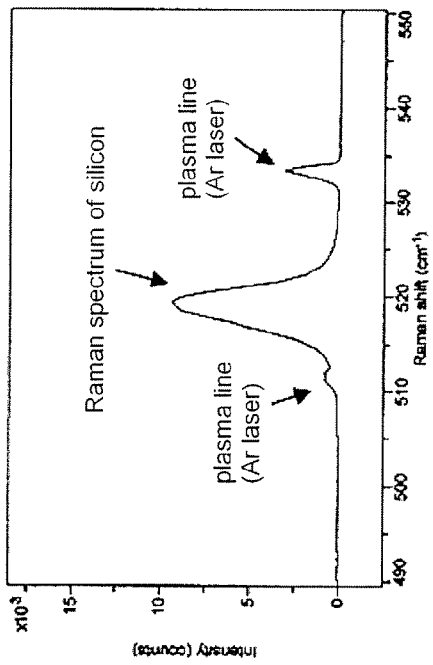
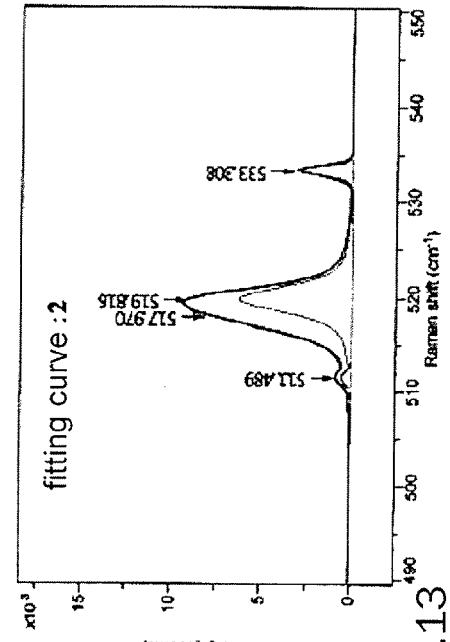
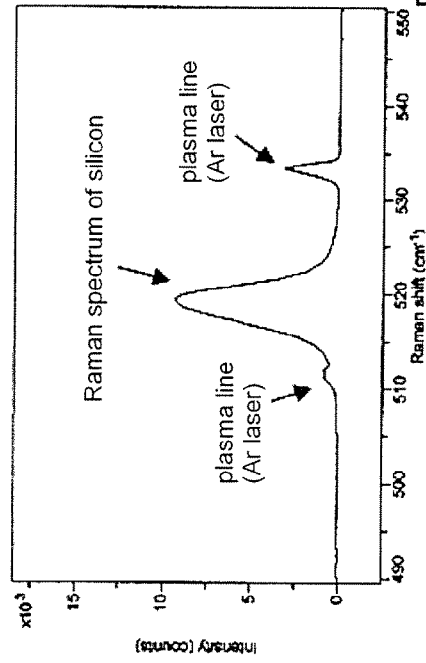
curve fitting by the use of either one of Gauss function, Lorentz function and Voigt function (Gauss function + Lorentz function)
Fig.13

$$\begin{pmatrix} \sigma_{xx} \\ \sigma_{yy} \\ \sigma_{zz} \\ \tau_{yz} \end{pmatrix} = \begin{pmatrix} C_{11} & C_{12} & C_{13} & C_{14} & C_{15} \\ C_{21} & C_{22} & C_{23} & C_{24} & C_{25} \\ C_{31} & C_{32} & C_{33} & C_{34} & C_{35} \\ C_{41} & C_{42} & C_{43} & C_{44} & C_{45} \end{pmatrix} \cdot \begin{pmatrix} \nu_1 \\ A_1 \\ \omega_1 \\ \nu_2 \\ \nu_3 \end{pmatrix}$$

Fig.15 objective variable 6

$\sigma_{xx}, \ \sigma_{yy}, \ \sigma_{zz}, \ \tau_{xy}, \ \tau_{yz}, \ \tau_{zx}$ explanatory variable 25

$\nu_1(x-2\Delta x), \ A_1(x-2\Delta x), \ \omega_1(x-2\Delta x), \ \nu_2(x-2\Delta x), \ \nu_3(x-2\Delta x)$ $\nu_1(x-\Delta x), \ A_1(x-\Delta x), \ \omega_1(x-\Delta x), \ \nu_2(x-\Delta x), \ \nu_3(x-\Delta x)$ $\nu_1(x), \ A_1(x), \ \omega_1(x), \ \nu_2(x), \ \nu_3(x)$ $\nu_1(x+\Delta x), \ A_1(x+\Delta x), \ \omega_1(x+\Delta x), \ \nu_2(x+\Delta x), \ \nu_3(x+\Delta x)$ $\nu_1(x+2\Delta x), \ A_1(x+2\Delta x), \ \omega_1(x+2\Delta x), \ \nu_2(x+2\Delta x), \ \nu_3(x+2\Delta x)$ analytical curve (matrix) : 6×25

Fig.16 objective variable 4

$\sigma_{xx}, \sigma_{yy}, \sigma_{zz}, \tau_{yz}$ explanatory variable 25

$\nu_1(x-2\Delta x), A_1(x-2\Delta x), \omega_1(x-2\Delta x), \nu_2(x-2\Delta x), \nu_3(x-2\Delta x)$ $\nu_1(x-\Delta x), A_1(x-\Delta x), \omega_1(x-\Delta x), \nu_2(x-\Delta x), \nu_3(x-\Delta x)$ $\nu_1(x), A_1(x), \omega_1(x), \nu_2(x), \nu_3(x)$ $\nu_1(x+\Delta x), A_1(x+\Delta x), \omega_1(x+\Delta x), \nu_2(x+\Delta x), \nu_3(x+\Delta x)$ $\nu_1(x+2\Delta x), A_1(x+2\Delta x), \omega_1(x+2\Delta x), \nu_2(x+2\Delta x), \nu_3(x+2\Delta x)$ analytical curve (matrix) : 4×25

Fig.17

Shift : stress calculated from peak shift(explanatory variable 1)

PLS A : case 2(explanatory variable 5)

PLS B : case 4(explanatory variable 25)

STRESS COMPONENT MEASUREMENT METHOD

FOREIGN APPLICATION PRIORITY

Priority is claimed from Japanese Patent Application P2006-277028 filed on Oct. 10, 2006 and Japanese Patent Application P2007-171149 filed on Jun. 28, 2007.

BACKGROUND OF THE INVENTION AND RELATED ART STATEMENT

The present claimed invention relates to a stress component measurement method especially preferably used for measuring a stress component of a measurement specimen whose shape and composition are standardized to a certain degree such as a mass-produced semiconductor substrate.

A stress is a tensor and if a measurement surface is virtually defined, a shear stress component or a normal stress component (collectively called as a stress component) in the measurement surface are determined. As a method for measuring the stress, there are the XRD (X-ray diffraction) and the CBED (convergent beam electron diffraction) as shown in the patent document 1 and the patent document 2. In accordance with the XRD, the stress component of a specimen can be measured without destroying the specimen, however, it takes several minutes to measure one point. In addition, in accordance with the CBED, the stress component of a specimen can be measured accurately by making use of extremely high spatial resolution of less than 100 nm. However, since the specimen has to be destroyed in order to measure the stress component of the specimen, another specimen for measurement has to be prepared separately. As a result, there is a problem that the measuring object is not identical to the separately prepared specimen. In addition, the stress component is measured by the Raman spectroscopy as being a nondestructive testing as shown in the patent document 3. It is possible for the Raman spectroscopy to measure a stress component at one point of, for example, single crystal silicon in a short period of time of several seconds, however, it is difficult to measure all of the stress component. The backscattering layout as being the easiest optical layout of the Raman spectroscopy can measure only a stress of one component.

As mentioned, in case of measuring a stress component, there is some problem in the time required for measurement, non-destructive measurement or a measurable direction of a stress even if either one of the conventional method is utilized.

In addition, a stress is loaded intentionally or in spite of intentions on a micro-structure of a semiconductor device represented by the STI (the shallow trench isolation) by embedding a film of $SiO_2$ or the like, however, it has been known that an electrical property of the semiconductor device changes significantly due to its stress state. Then it becomes necessary to evaluate and administrate the stress value accurately due to recent state that a pattern size of the semiconductor device is miniaturized.

Generally it has been known that the XRD is the most accurate and effective method for measuring the stress/strain of silicon. However, an area that can be evaluated by the XRD is limited due to its measurement principle and the area that can be measured by a commercially available device is several dozen μm at the minimum. On the contrary, since a size of the micro-structure of the semiconductor device such as the STI becomes smaller than sub-μm due to miniaturized pattern size, it is difficult to evaluate the stress by using the XRD.

In addition, the CBED is effective for measuring a strain of sub-μm order or nm order, however, in accordance with the CBED, another specimen for measurement has to be prepared separately because a specimen has to be destroyed in order to measure the strain of the specimen. Furthermore, the CBED is suitable for measurement of extremely subtle area of nm order, however, it takes substantial time to measure a relatively wide area of μm order.

As a result, both methods of the XRD and the CBED are inappropriate as a method for administration in a manufacturing process of the semiconductor devices.

Patent document 1 Japan patent laid-open number Hei1-219529

Patent document 2 Japan patent laid-open number 2000-009664

Patent document 3 Japan patent laid-open number 2006-73866

SUMMARY OF THE INVENTION

A main object of the present claimed invention is to make it possible to measure each stress component accurately without destroying a measuring object in a short period of time by the use of the Raman spectroscopy.

More specifically, a stress component measurement method is characterized by comprising a stress component comparison step that compares a Raman spectrum obtained in a predetermined area (hereinafter called as a reference area) of a reference specimen to which a given stress component is applied with the stress component, a correlation data production step that conducts the stress component comparison step on each of the multiple reference areas to which a different stress component is applied and that produces correlation data indicating a correlation between the Raman spectrum and the stress component by the use of a multivariate analysis method based on the result of the stress component comparison step, and a stress component calculation step that calculates a stress component applied to a measurement area based on a Raman spectrum obtained in an area (hereinafter called as a measurement area) of a measurement specimen whose composition is the same as that of the reference specimen and the correlation data.

In accordance with this arrangement, since the Raman measurement result of the measurement specimen is checked against the correlation data, it becomes possible to calculate each stress component of the measurement specimen that used to be difficult to calculate by the use of the Raman spectroscopy. In addition, since the Raman measurement to be conducted on the measurement specimen requires only once, there is no need of destroying the measurement specimen and stress component measurement can be conducted in a short period of time. Furthermore, since the multivariate analysis method is used, it is possible to obtain the correlation data without difficulty.

In addition, as an embodiment of a device to which the present claimed is applied represented is a stress component measurement device comprising a stress component comparison section that compares a Raman spectrum obtained in a predetermined area (hereinafter called as a reference area) of a reference specimen to which a given stress component is applied with the stress component, a correlation data production section that obtains comparison results conducted by the stress component comparison section for each of the multiple reference areas to which a different stress component is applied and that produces correlation data indicating a correlation between the Raman spectrum and the stress component by applying a multivariate analysis method to the comparison results, a correlation data storage section that stores the correlation data, and a stress component calculation section that calculates a stress component applied to a measurement area based on a Raman spectrum obtained in an area (hereinafter called as a measurement area) of a measurement specimen whose composition is the same as that of the reference specimen and the correlation data.

More specifically, it is preferable that the correlation data indicates a correlation between a peak shift value, a peak intensity value and a spectrum FWHM (Full Width at Half Maximum) of the Raman spectrum and each stress component.

The peak shift value, the peak intensity value and the spectrum FWHM (Full Width at Half Maximum) may be derived as a parameter (hereinafter also called as a spectrum parameter) expressing the spectrum element indicated by the Gauss function/Lorentz function, namely, the peak shape by approximating the Raman spectrum by the Gauss function/Lorentz function.

The correlation data is not limited to the data obtained by the multivariate analysis alone. More specifically, comparison results conducted by the stress component comparison section for each of the multiple reference areas to which a different stress component is applied may be obtained and the correlation data indicating a correlation between the Raman spectrum and the stress component may be produced based on the comparison results.

As mentioned, in accordance with this invention, since the correlation data (the analytical curve) regarding each stress component is made based on the Raman spectrum data of the reference specimen and each stress component is obtained from the Raman spectrum data of the measurement specimen by the use of the correlation data, the stress component applied to the measuring object can be measured in a short period of time without destroying the measuring object by conducting the Raman measurement once.

BRIEF DESCRIPTION OF THE DRAWINGS

FIG. 4 is a magnified view and a cross-sectional view showing a measurement area of a reference specimen in this embodiment.

FIG. 8 is an example of an expression including a matrix indicating a relationship between each stress component value and a change of a peak shape in this embodiment.

FIG. 10 is a table showing a selection rule of Raman scattering light in accordance with the second embodiment of this invention.

FIG. 11 is a magnified view (a), a cross-sectional view (b) and a front view (c) showing a measurement area of other reference specimen in accordance with the first embodiment of this invention.

FIG. 12 is a spectrum obtained at a measurement area (d) of the reference specimen in this embodiment.

FIG. 13 is a spectrum obtained at a measurement area (e) of the reference specimen in this embodiment.

FIG. 15 is other example of an expression including a matrix indicating a relationship between each stress component value and a change of a peak shape in this embodiment.

FIG. 16 is an example of a combination of each stress component value (response variable) and a change of the peak shape (explanatory variable) in this embodiment.

FIG. 17 is other example of a combination of each stress component value (response variable) and a change of the peak shape (explanatory variable) in this embodiment.

DETAILED DESCRIPTION OF THE PREFERRED EMBODIMENTS

First Embodiment

Figure 1:
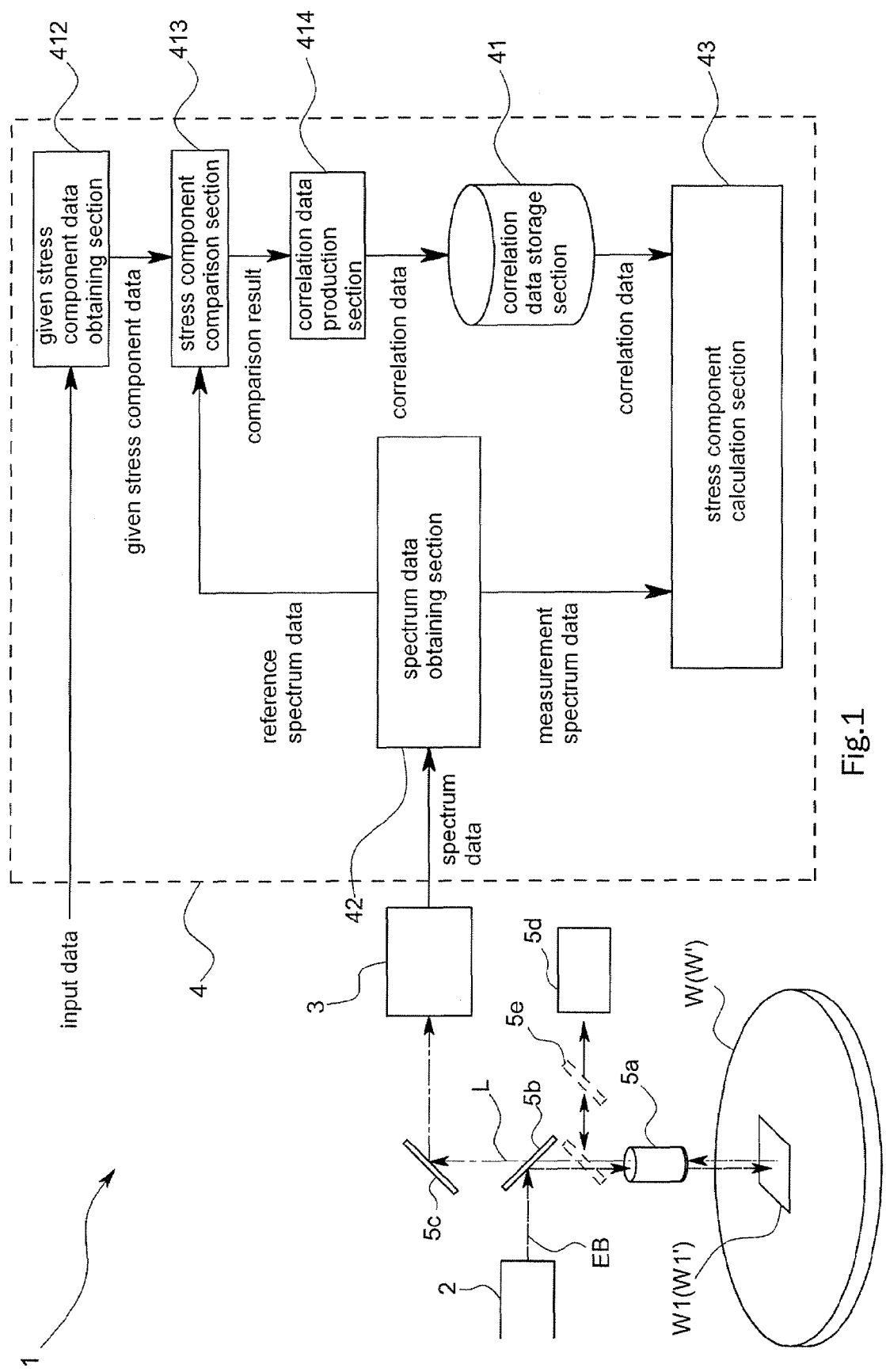
FIG. 1 is a pattern structural diagram showing an overall picture of a stress component measurement device in accordance with one embodiment of the present claimed invention.

A first embodiment of this invention will be explained with reference to drawings.

A stress component measurement device 1 in accordance with this embodiment can measure a stress component in a measurement area of, for example, a semiconductor measurement specimen whose shape and composition are standardized in a nondestructive manner. As its pattern structural diagram is shown in FIG. 1, the stress component measurement device 1 comprises a laser device 2 as being an excitation line irradiation device, a sensor mechanism 3 that receives Raman scattering light L and an information processing unit 4 or the like.

Each section will be explained in detail. The laser device 2 irradiates ultraviolet laser EB whose excitation wavelength is, for example, 363.8 nm as being excitation lines. An irradiation object is a predetermined area (hereinafter called as a reference area) W1 of a reference specimen W and a measurement area W1' of a measurement specimen W1'. The reference specimen W and the measurement specimen W' will be explained briefly. Each of a composition and a structure is common in the reference specimen W and the measurement specimen W', and multiple convex micro-structures 9 are formed in parallel on a surface of a flat plate made of Si with forming grooves on the surface by means of etching, as shown in FIG. 4. In this embodiment the micro-structure is, for example, a shallow trench isolation structure.

As shown in FIG. 1, the sensor mechanism 3 receives the Raman scattering light L generated by irradiating the ultraviolet laser EB on the irradiation object and outputs spectrum data of the Raman scattering light L. In this embodiment, the sensor mechanism 3 comprises a spectroscopy section, not shown in drawings, to disperse the Raman scattering light L and multiple sensors, not shown in drawings, to detect the light intensity of each light dispersed by the spectroscopy section. An optical layout to measure the Raman scattering light L is backscattered in this embodiment, however, it is not limited to this.

Furthermore, in this embodiment, an optical system is arranged between the laser device 2 and the sensor mechanism 3 to focus and irradiate the laser EB on the irradiation object and to collect the Raman scattering light L from the irradiation object. The optical system comprises, as shown in FIG. 1, for example, an objective lens 5a, a half mirror 5b to adjust an irradiation angle of the ultraviolet laser EB and a mirror 5c to introduce the Raman scattering light L into the sensor mechanism 3. In FIG. 1, a referential code 5d is a camera for optical observation used for verifying a position where the laser EB is irradiated, and a referential code 5e is a second half mirror to introduce the light into the camera 5d, and each of which is arranged detachably on an optical path.

The information processing unit 4 to process data output from the sensor mechanism 3 is a so-called computer comprising, for example, a CPU, a memory or other peripheral devices and produces functions of the following each section by operating the CPU in accordance with a program stored in the memory. More specifically, as shown in FIG. 1, the information processing unit 4 comprises a correlation data storage section 41 that stores correlation data indicating a correlation between the Raman spectrum from the reference area W1 and the stress component applied to the reference area W1, a spectrum data obtaining section 42 that obtains data (Raman spectrum data) regarding the Raman spectrum obtained from the reference area W1 (and the measurement area W1' to be described later) and a stress component calculation section 43 that calculates a stress component of the measurement specimen W' by checking the correlation data against the Raman spectrum data of the measurement specimen W'.

The correlation data corresponds to so-called an analytical curve, and in order to produce the correlation data, the information processing unit 4 further comprises a given stress component data obtaining section 412 that obtains given stress component data applied to the reference area W1, a stress component comparison section 413 that compares the given stress component data with the spectrum data of the reference area W1 obtained in the spectrum data obtaining section 42 and a correlation data production section 414 that produces correlation data between the given stress component data and the spectrum data based on the comparison result and that writes the correlation data into the correlation data storage section 41.

Next, an operation of the stress component measurement device 1 of the above-mentioned arrangement will be explained.

Figure 2:
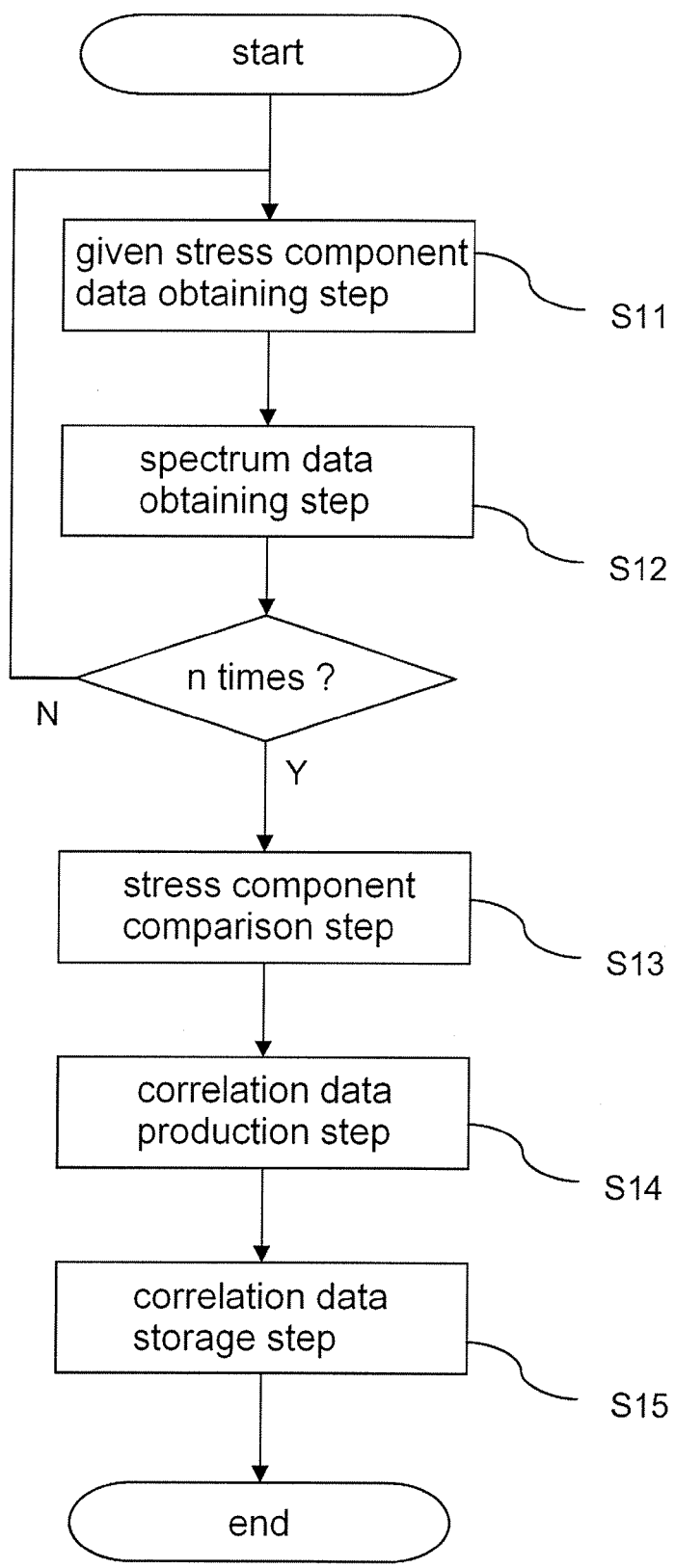
FIG. 2 is a flow chart showing a flow until correlation data is stored in this embodiment.

First, the correlation data is stored in the correlation data storage section 41 in accordance with the steps shown in FIG. 2.

For example, an operator inputs the given stress component value of the reference area W1 into the information processing unit 4 and the given stress component data obtaining section 412 obtains its input data (step S11).

The given stress component value can be obtained with an actual measurement by the use of the CBED (the convergent beam electron diffraction), the EBSD (electron backscatter diffraction), the near-field Raman, the NBD (the nano beam diffraction) or the CL (the cathode luminescence) It can be also obtained by an analytical method such as the FEM (the finite element method) or may be obtained by applying a desired stress by a material testing machine (a tensile tester, a bending tester or a compression tester).

For an actual semiconductor device, a stress is intentionally loaded by embedding a film of $SiO_2$ or the like into a micro-structure and the stress value varies depending on a condition of manufacturing the film. In addition, various influences during a manufacturing process are added. Then there might be a case that a stress value obtained by, for example, the FEM analysis is not accurate.

On the contrary, in accordance with a method to obtain a given stress component value with applying a desired stress to the reference specimen W by the use of the tensile tester, it is possible to create a stress state without embedding the film of $SiO_2$ into the micro-structure. In addition, since the stress value receives no influence during the manufacturing process, a stress value obtained by the FEM analysis is extremely close to an actual value, which makes it possible to obtain an accurate correlation between the Raman spectrum and the stress value.

Furthermore, if a tensile tester for a specimen of a μ·nm order is used, it becomes possible to load a stress of a GPa order on the reference specimen W due to a dimension dependence of single crystal silicon on a breaking strength (the smaller in size, the higher the breaking strength becomes). As a result, it becomes possible to realize a state close to an actual semiconductor device that is small in size and on which a stress of a GPa order is locally loaded.

Before or after a step (step S11) wherein the given stress component data obtaining section 412 obtains the given stress component value, the ultraviolet laser EB is irradiated on the reference area W1. The ultraviolet laser EB irradiated from the laser device 2 is angled by the half mirror 5b and then reaches the reference area W1 through the objective lens 5a.

The Raman scattering light L from the reference area W1 is angled by the half lens 5c after passing through the objective lens 5a and the half lens 5b. Then the sensor mechanism 3 receives the Raman scattering light L and the spectrum data obtaining section 42 obtains the Raman spectrum data of the Raman scattering light L (step S12).

The steps S11 and S12 are conducted on multiple (n pieces of) reference areas W1 each of which different stress component is applied to.

Figure 5:
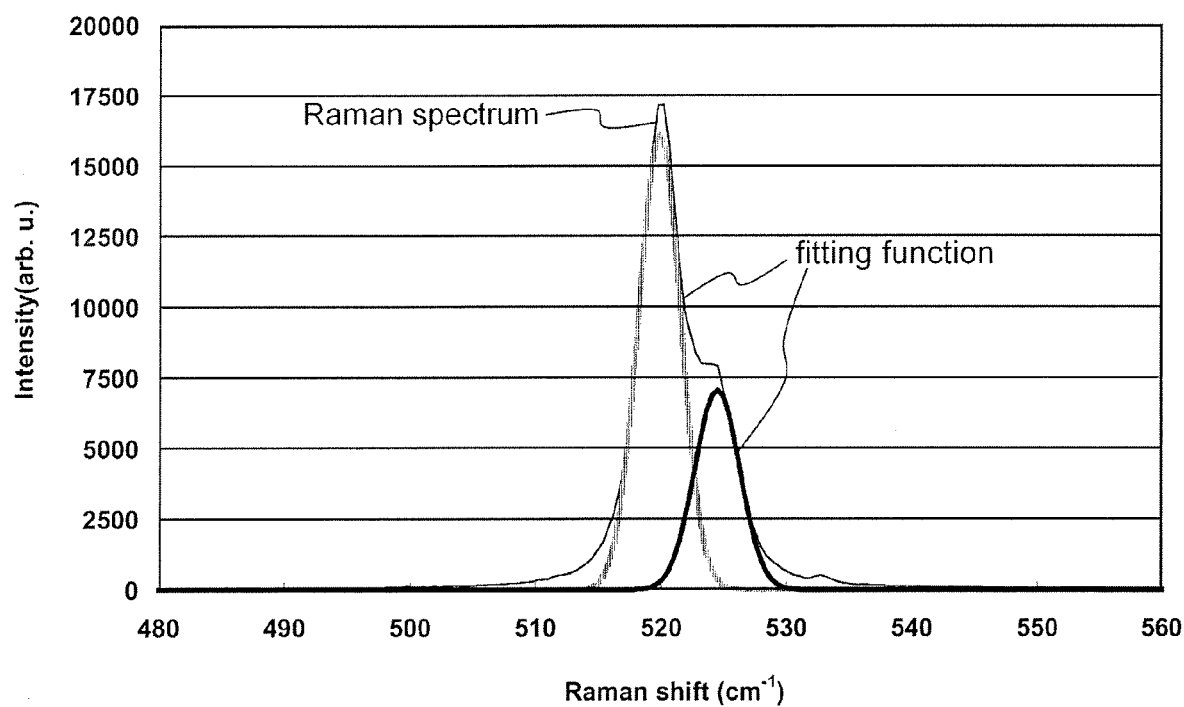
FIG. 5 is a spectrum obtained at a measurement position (a) of the reference specimen in this embodiment.
Figure 6:
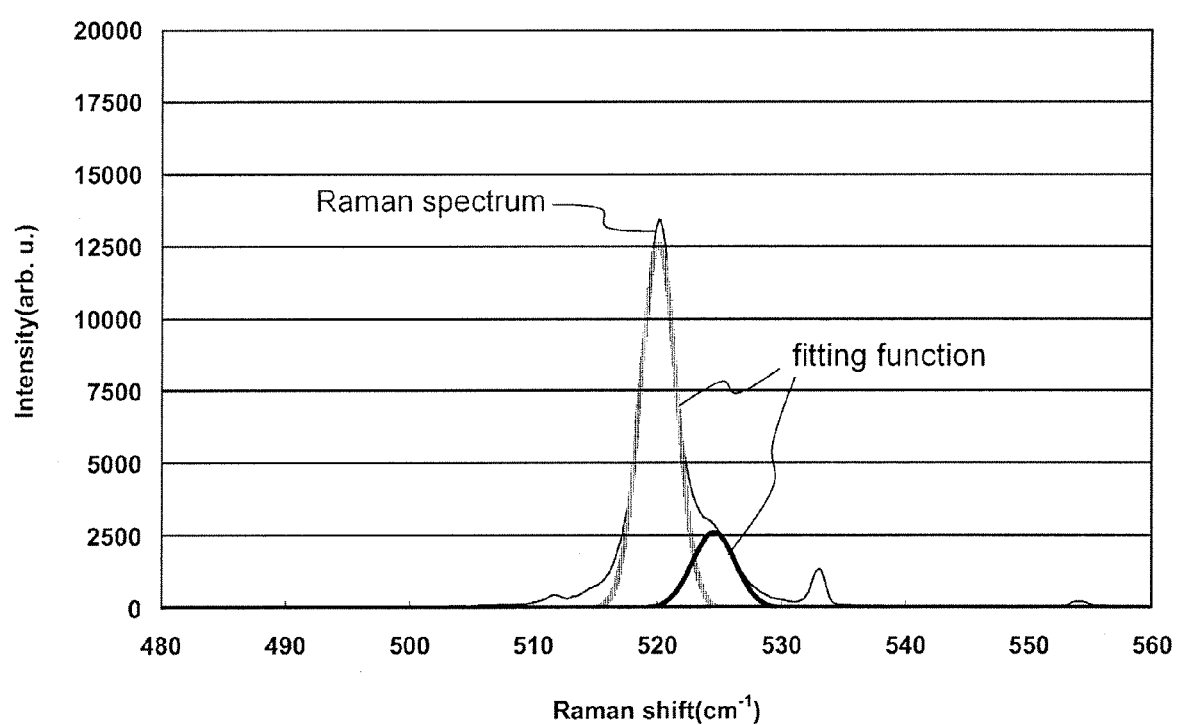
FIG. 6 is a spectrum obtained at a measurement position (b) of the reference specimen in this embodiment.
Figure 7:
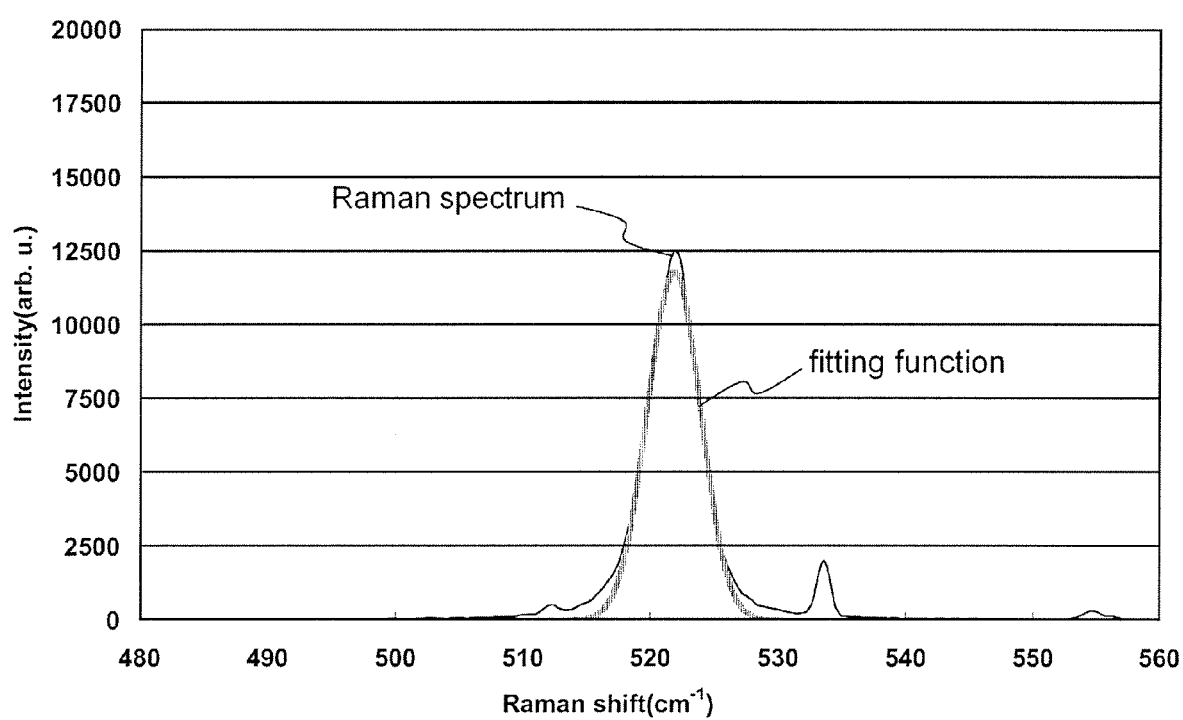
FIG. 7 is a spectrum obtained at a measurement position (c) of the reference specimen in this embodiment.

The multiple reference areas W1 are set at different positions on an identical reference specimen W. As its magnified view and its magnified cross-sectional view are shown in FIG. 4, the multiple reference areas W1 are, for example, W1(a) through W1(c) on a surface of the micro-structure 9. Examples of the Raman spectrum obtained on each of the predetermined areas W1(a) through W1(c) are shown in FIG. 5 through FIG. 7.

A reason why the ultraviolet laser EB of 363.8 nm in excitation wavelength is used as the excitation line is that a shape of the Raman spectrum easily changes more clearly in accordance with variations of the stress component. While a penetration depth of a generally used visible laser (457.9 nm, 488.0 nm, 514.5 nm, 632.8 nm or the like) into silicon is several hundred nm, a penetration depth of the ultraviolet laser EB of 363.8 nm is less than or equal to 10 nm. As a result, since a spectrum of the most surface layer of silicon can be obtained, it is possible to more accurately measure a stress state of the micro-structure 9 to the most surface of which a big stress is applied. It is a matter of course that laser of an appropriate wavelength may be used for the laser whose composition differs.

In addition, for example, in case that $SiO_2$ is embedded into the convex micro-structure 9 and a big stress is applied to an edge vicinity of the micro-structure 9, the Raman spectrum from the edge vicinity sometimes ramifies into multiple spectra. In this case, each stress component can be measured further more accurately by examining a characteristic of each ramified spectrum.

A shape of the convex micro-structure 9 may be a shape of lines with space, as shown in FIG. 4. In addition, it may be a rectangular solid (for example, 0.3 μm in height) whose front view is a square (for example, 4 μm×4 μm) whose magnified view and magnified cross-sectional view are shown in FIG. 11. The arrow in FIG. 11 indicates a direction to be pulled by the tensile tester. Various stress states are produced around the structure by loading the stress toward a direction shown by the arrow in FIG. 11 by the tensile tester.

The multiple reference areas W1 are, as shown in FIG. 11, a reference area W1($d$) as being a flat part and a reference area W1($e$) as being an edge part on the surface of the convex micro-structure 9. Examples of the Raman spectrum obtained from each of the predetermined areas W1($d$) and W1($e$) are shown in FIG. 12 and FIG. 13.

Figure 14:
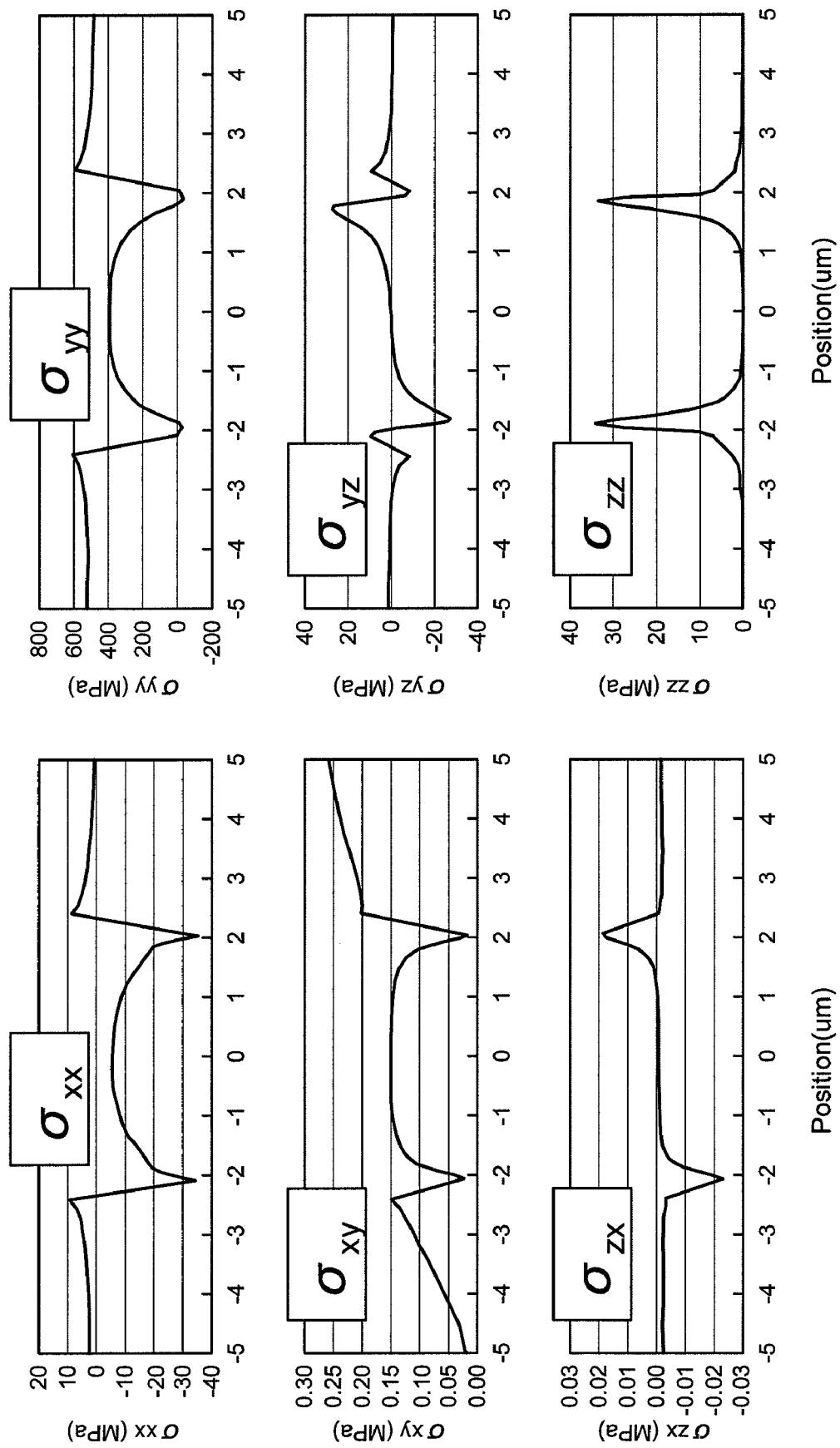
FIG. 14 is a stress distribution on a line L of the reference specimen in this embodiment.

Furthermore, as shown in FIG. 11($c$), a stress on a line L passing the predetermined areas W1($d$) and W1($e$) is analyzed by the use of the FEM (the finite element method), and its result (a stress distribution) is shown in FIG. 14.

In an embodiment shown in FIG. 12 and FIG. 13, a microscopic Raman spectrophotometer to measure a relatively minute area (about 1 μm) was used as a sensor mechanism 3 to apply a desired stress to the reference specimen W by the use of the tensile tester and to receive the Raman scattering light L. The ultraviolet laser of 363.8 nm in excitation wavelength was used as the excitation line.

In the Raman spectroscopy, a measurement area varies depending on an objective lens or an optical system to be used. In accordance with the microscopic Raman spectroscopy wherein a microscope is used as an optical system to irradiate laser on a specimen and to concentrate Raman light, in case that the ultraviolet laser of 363.8 nm in excitation wavelength is used as the excitation line and is used as the objective lens with X100 NA=0.9, a penetration depth of the light into silicon is 10 nm and a spot diameter of the laser is theoretically about 0.5 μm. Although the stress value by the use of the FEM (the finite element method) analysis can be calculated for every nodal point of each element of a calculation model, it is appropriate to use a mean value for every area as the stress value for the FEM analysis with considering a cubic volume from which the Raman spectrum can be obtained in case of using a correlation between the stress value and the Raman spectrum parameter.

Followed by the step S11 and the step S12, the stress component comparison section 413 compares the given stress component data with the spectrum data (step S13). According to the comparison result, it is proved that a shape of a peak appearing in a measured spectrum varies depending on an influence of each stress component. Based on the measurement result, the correlation data production section 414 produces the correlation data between the peak shape and each stress component. In this embodiment, the spectrum data is approximated by multiple (two) spectrum elements expressed by the Gaussian function, the Lorentz function or the asymmetric Gaussian function, and then the peak shift, the peak intensity and the spectrum FWHM (Full Width at Half Maximum) of each spectrum element are employed as a parameter expressing the peak shape.

In the embodiment shown in FIG. 12 and FIG. 13, a curve fitting was performed on the measured spectrum data by the use of either one of the Gaussian function, the Lorentz function and the Voigt function (Gaussian function+Lorentz function) and then each parameter expressing the peak shape of the peak shift, the peak intensity and the spectrum FWHM (Full Width at Half Maximum) of each spectrum element was obtained. A number of the fitting curve may be several, and an example of the Raman spectrum shown in FIG. 13 obtains two fitting curves.

A relationship between each stress component (a normal stress and a shear stress) value reduced to the micro-structure 9 and the peak shape is expressed by a formula containing a matrix shown in FIG. 8 (case 1). Each of $\sigma xx$, $\sigma yy$, $\sigma zz$, $\tau xy$, $\tau yz$ and $\tau zx$ indicates each stress component value, each of $C_{11}$ through $C_{66}$ indicates a correlation between each stress component and the peak shape, each of ν, A and ω indicates a parameter (a peak shift, a peak intensity and a spectrum FWHM (Full Width at Half Maximum) of a spectrum element in this order) expressing the peak shape, and each numeric suffixed to ν, A and ω indicates whether the first peak or the second peak. Under this precondition, the correlation data production section 414 produces correlation data (an analytical curve) as being a correlation coefficient ($C_{11}$ through $C_{66}$) between each stress component value and the peak shape by, for example, the partial least square (the PLS) method as being one of multivariate analysis methods (step S14) and stores its result in the correlation data storage section 41 (step S15).

In addition to the example shown in FIG. 8, since $\tau yz$ and $\tau zx$ can be generally ignored in case of applying a desired stress to the reference specimen W by the use of the tensile tester in order to obtain the given stress component value, a number of the response variable may be four and a number of the explanatory variable may be five (case 2) as shown in FIG. 15. Furthermore, an example wherein a number of the response variable is six and a number of the explanatory variable is twenty five is shown in FIG. 16 (case 3), and an example wherein a number of the response variable is four and a number of the explanatory variable is twenty five is shown in FIG. 17 (case 4).

The explanatory variable used in the multivariate analysis is not limited to a one-on-one relationship between the spectrum parameter (the peak shift, the peak intensity and the spectrum FWHM (Full Width at Half Maximum) of the spectrum element) and the response variable, and a group of multiple spectrum parameters to each response variable may be used.

Figure 18:
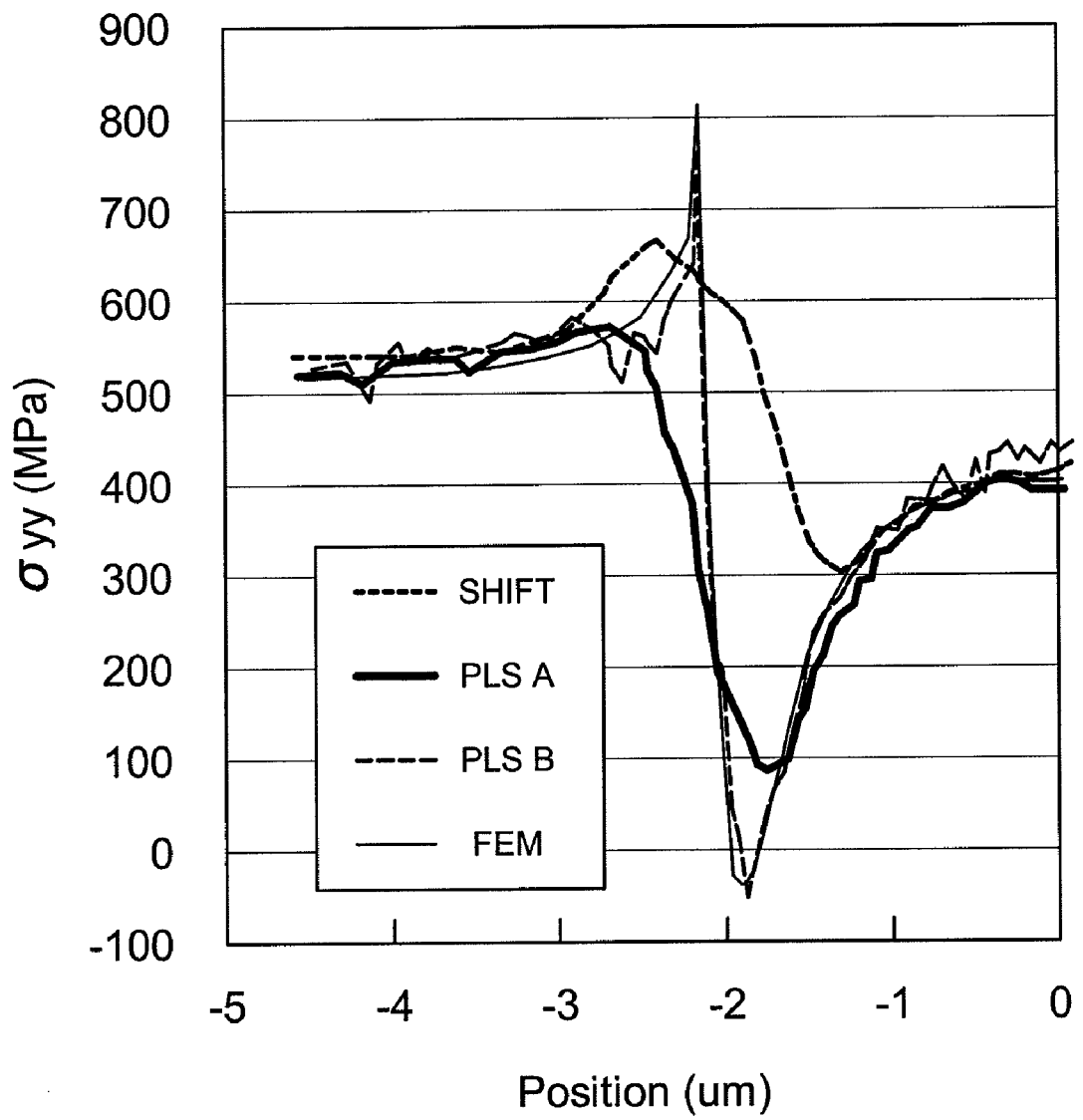
FIG. 18 is a stress ($\sigma yy$) obtained by the multivariate analysis in this embodiment.
Figure 19:
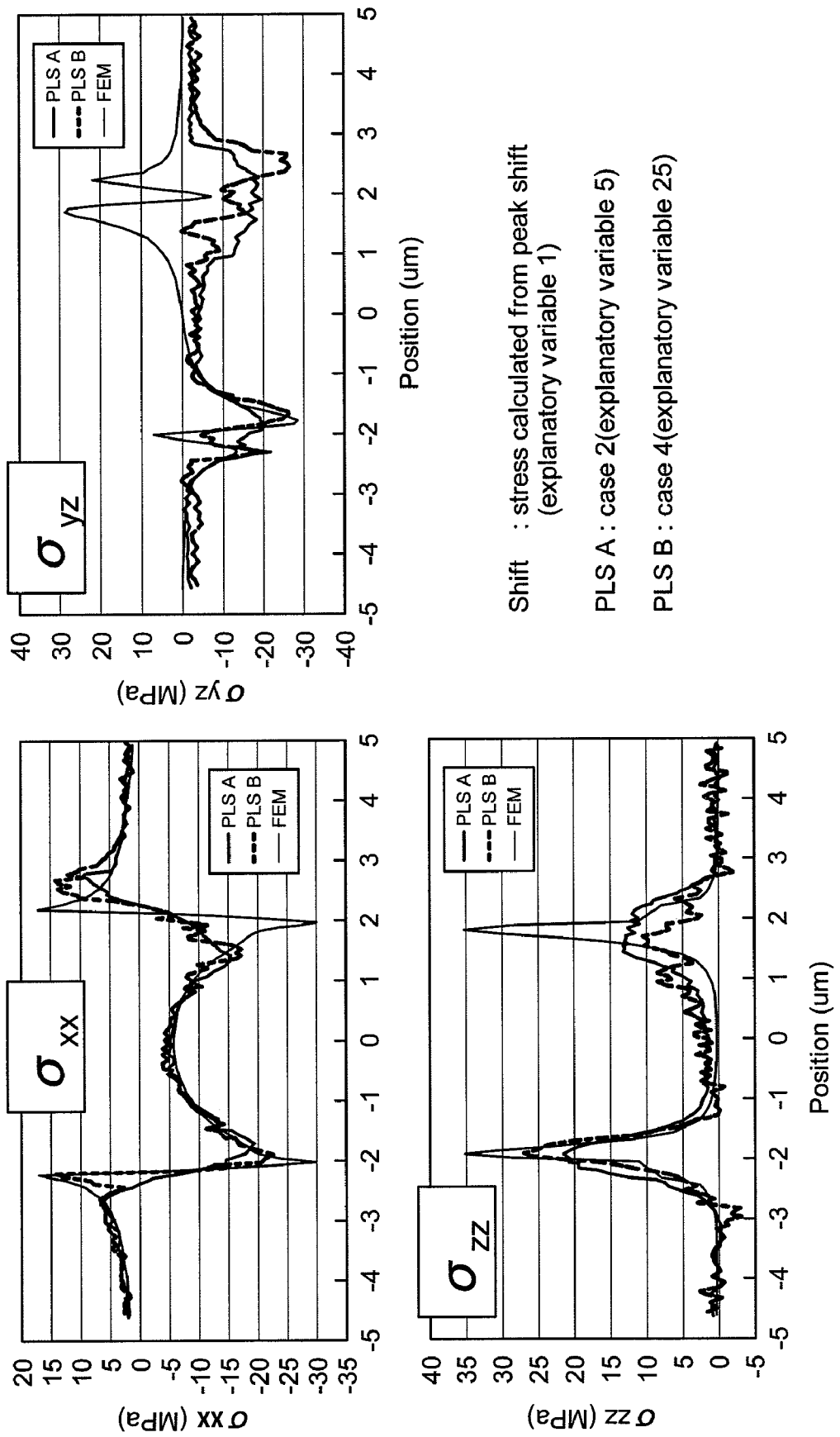
FIG. 19 is a stress ($\sigma xx$, $\sigma yy$, $\sigma yz$) obtained by the multivariate method in this embodiment.

Among the stresses obtained by the multivariate analysis, $\sigma yy$ is shown in FIG. 18, and $\sigma xx$, $\sigma zz$ and $\sigma yz$ are shown in FIG. 19.

Figure 3:
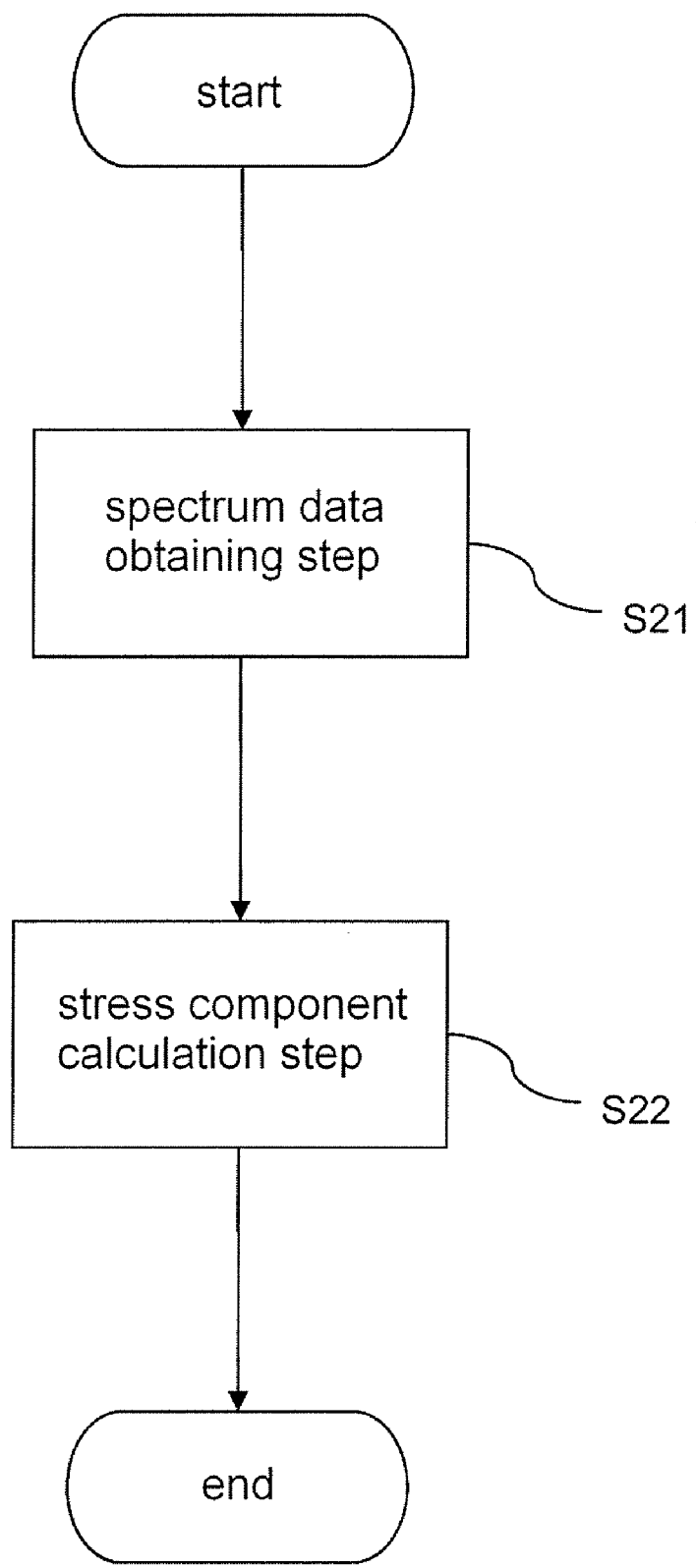
FIG. 3 is a flow chart showing a flow until a stress component is calculated in this embodiment.

After completion of the correlation data storage step (step S15) of the above procedure, a spectrum data of the measurement area W1' on the measurement specimen W' is obtained and its stress component is calculated in accordance with the procedure shown in FIG. 3. In this embodiment, the measurement specimen W' is a specimen whose shape and composition is the same as those of the reference specimen W and whose stress component is unknown.

First, similar to the step S12, the ultraviolet laser EB is irradiated on one measurement area W1' of the measurement specimen W' by the laser device 2. The sensor mechanism 3 receives the Raman scattering light L obtained by irradiating the ultraviolet laser EB on the measurement area W1' and the spectrum data obtaining section 42 obtains its spectrum data (step S21).

Then, the stress component calculation section 43 calculates each stress component value of the measurement specimen W' by comparing the spectrum data obtained in the step S21 with the correlation data (the analytical curve) stored in the correlation data storage section 41 in the step S15 (step S22).

As mentioned, in accordance with the stress component measurement device 1, since it is possible to calculate multiple stress components that apply to the measuring object itself at once by comparing the analytical curve (the correlation data) regarding multiple stress components that has been previously made by the use of the multivariate analysis method based on the spectrum data of the reference specimen with the spectrum data obtained by the Raman measurement conducted once on the measurement specimen, a stress component can be measured accurately only while the Raman measurement is conducted once and the stress component is calculated, and there is no need of destroying the measuring object. As a result, since nondestructive measurement on the measurement specimen can be conducted in a short period of time, it is possible to utilize this measurement for a processing line.

Second Embodiment

Next, a second embodiment of the present claimed invention will be explained with reference to drawings. The same parts as those in the first embodiment are denoted by the same reference numerals as those in the embodiment.

Figure 9:
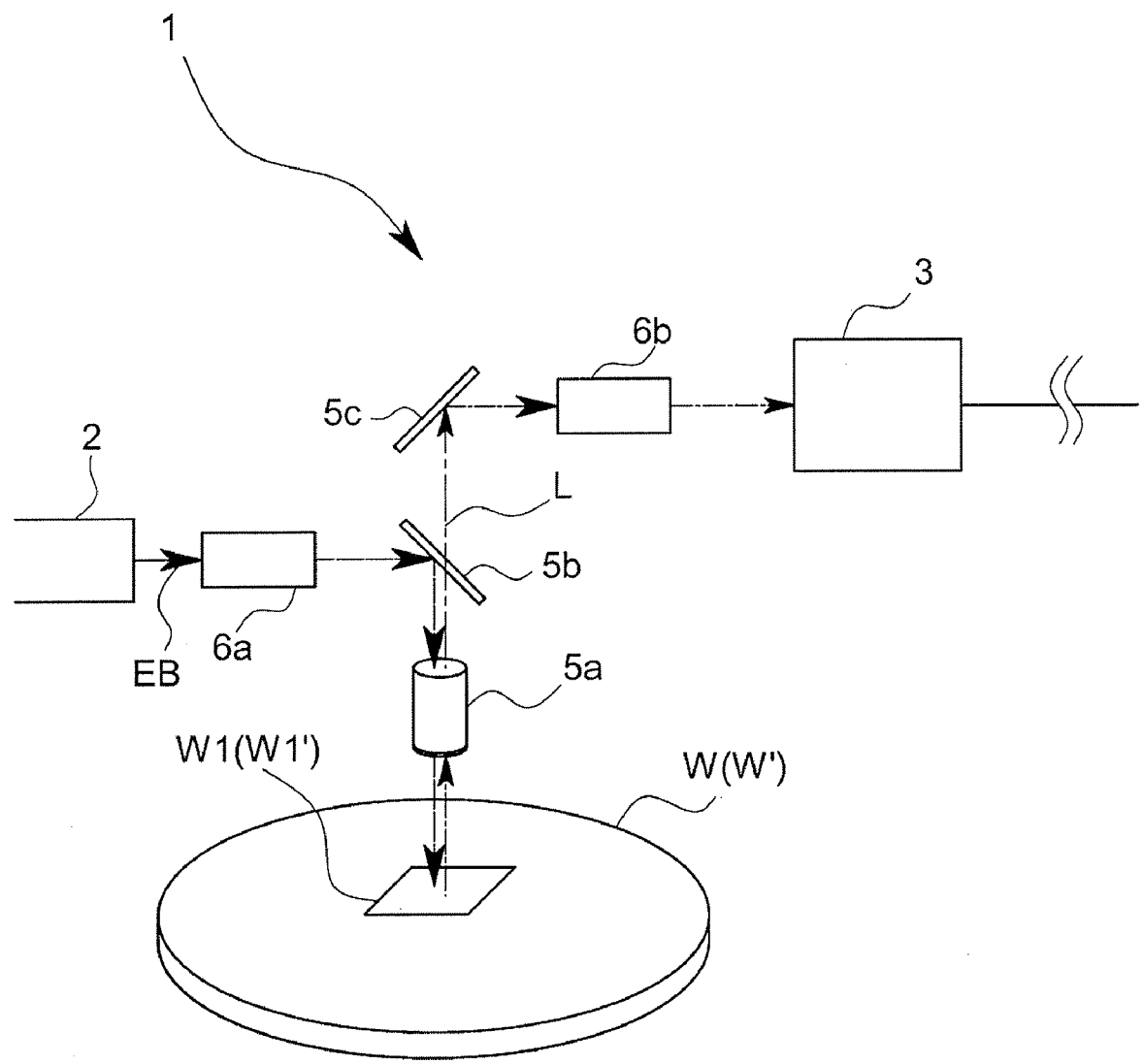
FIG. 9 is a pattern structural diagram showing a part of a stress component measurement device in accordance with a second embodiment of this invention.

The stress component measurement device 1 in accordance with this embodiment, as a part of which is shown in FIG. 9, has an arrangement wherein light polarizing devices 6a, 6b that is detachable and that can adjust an angle in stages are arranged between the laser device 2 and the half mirror 5b, and between the half mirror 5c and the sensor mechanism 3.

More concretely, in case of obtaining the spectrum data by the use of the stress component measurement device 1 of the above-mentioned arrangement, Raman measurement is conducted by adjusting angles of the light polarizing devices 6a, 6b so as to obtain a desired spectrum data with considering a selection rule for Raman scattering shown in FIG. 10. For example, the Raman measurement is conducted by adjusting the angle of the light polarizing device 6a so that the ultraviolet laser EB is incident on a Si(110) surface of the reference area W1 toward a [1-11] direction and adjusting the angle of the light polarizing device 6b so as to receive the Raman scattering light L from the [1-11] direction on the Si(110) surface, and then the Raman measurement is conducted by adjusting the light polarizing device 6b at 60° and 90° counterclockwise. The stress component calculation section 43 calculates the stress component of the measurement area W1' by comparing the correlation data produced by the correlation data producing section 414 based on the data obtained by separately approximating three kinds of the spectrum data obtained for the reference area W1 with the spectrum data of the measurement area W1' measured at three angles.

In accordance with this arrangement, since the Raman spectrum L obtained from the measurement area W1' shows a more distinguishing shape depending on each stress component applied to the measurement area W1', it is possible to calculate the stress component value more accurately by making use of its spectrum data.

More specifically, it is possible for the device shown in FIG. 9 wherein the polarization analysis is used to obtain the stress component values (a plane stress and a shear stress on each surface) regarding the Si(110) surface and a Si(111) surface, which can not be obtained without using the polarization analysis. In addition, since the information on the LO phonon on a Si(100) surface can be obtained with higher accuracy than a case wherein no polarization analysis is used, the stress component regarding the phonon also can be derived with higher accuracy than a case wherein no polarization analysis is used. In addition, there is a possibility that the stress component other than the above-described also can be obtained by means of the polarization measurement and by the use of the multivariate analysis method.

In addition, it becomes possible to measure different measurement specimens such as the Si(110) surface and the Si(111) surface during a processing line if the angle of the light polarizing devices 6a, 6b is adjusted when needed.

Furthermore, in accordance with this embodiment, it is possible to obtain a value regarding each direction of physical properties such as a concentration or a crystallization degree other than the stress. In addition, the incident angle of the ultraviolet laser EB may be set variously in addition to a back arrangement wherein an incident angle to the measurement specimen W' is vertical, and it becomes possible to evaluate the stress component further more accurate if information with various different angles are combined.

The present claimed invention is not limited to the above-mentioned embodiment.

For example, the excitation line irradiating on the measuring object is not limited to the ultraviolet laser, and may be visible lasers, ultraviolet radiations, visible radiations or near-infrared radiations. The excitation wavelength of the excitation line is not limited to 363.8 nm, and it may be selected depending on a depth of the information to be obtained because an incident depth to the specimen varies in accordance with the wavelength.

The irradiation angle of the laser may be any as far as the Raman scattering light can be obtained from the reference specimen and the measurement specimen, and the angle of the half mirror may be changed in accordance with a desired angle.

The reference specimen and the measurement specimen are not limited to the convex micro-structure made of Si, and may be in any shape as far as it is made of a material that emits different spectra depending on a wavelength or a measuring position.

The parameter expressing the peak shape is not limited to the peak shift and the peak intensity and the spectrum FWHM (Full Width at Half Maximum) of the spectrum element, and may be any as far as it expresses the shape of the Raman spectrum.

In order to calculate the correlation data, it is not necessary to obtain the spectrum data from different predetermined areas of a single reference specimen. Each spectrum data from multiple reference specimens to each of which different stress component is applied may be obtained.

In addition, the multivariate analysis method may be applied to all of the Raman spectrum data obtained from various positions of the reference specimen W. In this case, it is possible to obtain more detailed information on not only the stress component value applied to the material but also a value regarding the concentration of the material and the crystallization degree.

The correlation data production method is not limited to the multivariate analysis method, and may be a stochastics statistics method as far as it can produce the correlation.

In addition, an optical system having the function equivalent to that of the light polarizer may be used instead of the light polarizer as far as it can produce the same effect as that of the second embodiment. In addition, the material of the measurement specimen is not limited to Si, and may be a material whose physical properties change when the light polarizer is utilized.

Furthermore, a size of the reference area or the measurement area may be adjusted by expanding or shrinking the laser irradiation area and it may be adjusted by expanding or shrinking the light receiving range of the Raman light by the use of an optical system in a light receiving side. For example, as an example of adjusting the measurement range by the laser irradiation diameter (a spot diameter), it is conceived that multiple objective lenses each of whose focal length differs are prepared and switched or that a distance between the objective lens and the specimen is set to be variable, in case of using the objective lens like the above-mentioned embodiment. In addition to this, the laser irradiation area may be expanded or shrunk by changing a scan range by utilizing a galvanometer mirror. As an example of adjusting the measurement range by means of the optical system at the light receiving side, it is possible to expand or shrink an aperture of a confocal hole in case of using, for example, a confocal optical system. The confocal hole is arranged in front of the sensor mechanism 3, for example, shown in FIG. 1.

In addition, in case of obtaining a correlation between the stress value and the spectrum parameter, raw data of the spectrum may be used without calculating the spectrum parameter by means of the curve fitting.

Furthermore, in the Raman spectroscopy, it is known that the peak shift value, the peak intensity value and the spectrum FWHM (Full Width at Half Maximum) of the spectrum element change significantly due to laser irradiation power to the optical system or the specimen, and the integrating time to take in the Raman light. Then, in order to eliminate a change of the spectrum element due to a change of the measurement condition such as the integrating time, the reference specimen may be measured prior to measurement of the specimen and the differential of the peak shift, the peak intensity and the spectrum FWHM (Full Width at Half Maximum) between the specimen and the reference specimen can be used as the spectrum parameter. In case that the measurement specimen is silicon, bare silicon with no load is preferable as the reference specimen.

In addition, a near-field Raman spectrophotometer may be used as the sensor mechanism 3. In case that the near-field Raman spectrophotometer is used as the sensor mechanism 3, it becomes possible to measure a very micro area of a subnanometer order, which enables evaluation of a stress in a more micro area.

The measurement specimen W' may be other than a specimen wherein a micro-structure such as a STI structure is formed on its surface. This invention is also effective for measuring a stress around a gate of a transistor. For example, if a gate obtained by means of the CBED or the FEM analysis or a stress around the gate is set as a reference and a correlation between the reference and the Raman spectrum is obtained, it becomes possible to evaluate a stress around the gate from a Raman spectrum.

In addition, the measurement specimen W' may be a specimen made of a material other than silicon. It is possible for this invention to make an analytical curve of a stress·a strain applied to a micro-structure as far as the specimen is made of a material of a single crystal wherein a measured Raman spectrum changes due to a change of a stress·a strain. As this kind of material represented is a compound semiconductor, for example, germanium, SiGe and GaAs.

Furthermore, even though a specimen is made of a material having neither single crystal nor amorphous structure, it is possible for this invention to make an analytical curve of a stress·a strain of the specimen as far as the specimen is made of a material wherein the measured Raman spectrum changes due to a change of a stress·a strain. As this kind of materials represented are poly-Si, NiSi, TiSi, SiN film and SiOC film. Since a size of a crystal grain might affect a measured spectrum shape significantly in case of those materials, it requires care in selecting the spot diameter. For example, in case that the crystal grain is bigger than or equal to 1 μm, if the measurement is conducted with the spot diameter of 1 μm by the use of a microscopic Raman spectrophotometer as the sensor mechanism 3, all that can be obtained is information on a local area alone. As a result, in case that information on all area including the crystal grain is required, it is necessary to measure a bigger spot diameter.

In addition, a part or all of the above-mentioned embodiment or the modified embodiment may be appropriately combined. This invention is not limited to the above-mentioned embodiment and it is a matter of course that this invention may be variously modified without departing from the spirit of the invention.

The invention claimed is:

1. A stress component measurement method using an irradiation device, a sensor and an information processing unit, comprising:

a stress component comparison step that compares a Raman spectrum obtained in a predetermined reference area of a reference specimen to which said given stress component is applied with the stress component, a correlation data production step that conducts the stress component comparison step on each of the multiple reference areas to which a different stress component is applied and that produces correlation data indicating a correlation between the Raman spectrum and the stress component by the use of a multivariate analysis method based on the result of the stress component comparison step, and a stress component calculation step that calculates a stress component applied to a measurement area based on a Raman spectrum obtained in a measurement area of a measurement specimen whose composition is the same as that of the reference specimen and the correlation data.

2. The stress component measurement method described in claim 1, wherein the correlation data indicates a correlation between a peak shift value, a peak intensity value and a spectrum FWHM (Full Width at Half Maximum) of the Raman spectrum and each stress component.

3. A stress component measurement device comprising:

a stress component comparison section that compares a Raman spectrum obtained in a predetermined reference area of a reference specimen to which said given stress component is applied with the stress component, a correlation data production section that obtains comparison results conducted by the stress component comparison section for each of the multiple reference areas to which a different stress component is applied and that produces correlation data indicating a correlation between the Raman spectrum and the stress component by applying a multivariate analysis method to the comparison results, a correlation data storage section that stores the correlation data, and a stress component calculation section that calculates a stress component applied to a measurement area based on a Raman spectrum obtained in the measurement area of a measurement specimen whose composition is the same as that of the reference specimen and the correlation data.

4. A stress component measurement device comprising:

a stress component comparison section that compares a Raman spectrum obtained in a predetermined reference area of a reference specimen to which said given stress component is applied with the stress component, a correlation data production section that obtains comparison results conducted by the stress component comparison section for each of the multiple reference areas to which a different stress component is applied and that produces correlation data indicating a correlation between the Raman spectrum and the stress component based on the comparison results, a correlation data storage section that stores the correlation data, and a stress component calculation section that calculates a stress component applied to a measurement area based on a Raman spectrum obtained in the measurement area of a measurement specimen whose composition is the same as that of the reference specimen and the correlation data.

* * * * *